United States Patent [19]
Rink

[11] Patent Number: 5,669,629
[45] Date of Patent: Sep. 23, 1997

[54] AIRBAG INFLATION GAS GENERATION VIA A DECOMPOSING MATERIAL

[75] Inventor: Karl K. Rink, Liberty, Utah

[73] Assignee: Morton International, Inc., Chicago, Ill.

[21] Appl. No.: 632,698

[22] Filed: Apr. 15, 1996

[51] Int. Cl.[6] ............................................. B60R 21/28
[52] U.S. Cl. ............................................. 280/741
[58] Field of Search ............................................. 280/741

[56] References Cited

U.S. PATENT DOCUMENTS

| | | |
|---|---|---|
| 651,132 | 6/1900 | Davis . |
| 1,056,560 | 3/1913 | Lippincott . |
| 1,805,721 | 5/1931 | Kogl . |
| 2,334,211 | 11/1943 | Miller . |
| 2,403,932 | 7/1946 | Lawson . |
| 2,995,987 | 8/1961 | Fitzpatrick . |
| 3,664,134 | 5/1972 | Seitz ............................................. 60/274 |
| 3,862,866 | 1/1975 | Timmerman et al. ............................................. 149/21 |
| 3,958,949 | 5/1976 | Plantif et al. ............................................. 280/741 |
| 3,964,256 | 6/1976 | Plantif et al. ............................................. 280/741 |
| 3,986,456 | 10/1976 | Doin et al. ............................................. 280/741 |
| 5,060,973 | 10/1991 | Giovanetti . |
| 5,171,385 | 12/1992 | Michels et al. . |
| 5,330,730 | 7/1994 | Brede et al. . |
| 5,428,988 | 7/1995 | Starkovich ............................................. 73/40 |
| 5,464,248 | 11/1995 | Sasaki et al. ............................................. 280/741 |
| 5,470,104 | 11/1995 | Smith et al. . |
| 5,494,312 | 2/1996 | Rink . |
| 5,536,339 | 7/1996 | Verneker ............................................. 149/19.5 |

*Primary Examiner*—Kenneth R. Rice
*Attorney, Agent, or Firm*—Nick C. Kottis; Gerald K. White

[57] ABSTRACT

An apparatus and method for inflating a vehicular inflatable device are provided wherein inflation gas is produced via a decomposing material.

59 Claims, 6 Drawing Sheets

AIRBAG INFLATION GAS GENERATION VIA A DECOMPOSING MATERIAL

BACKGROUND OF THE INVENTION

This invention relates generally to inflatable restraint systems and, more particularly, to an apparatus and method for inflating an inflatable device such as an inflatable vehicle occupant restraint for use in such systems.

It is well known to protect a vehicle occupant using a cushion or bag, e.g., an "airbag," that is inflated/expanded with gas when the vehicle encounters sudden deceleration, such as in a collision. In such systems, the airbag is normally housed in an uninflated and folded condition to minimize space requirements. Upon actuation of the system, the airbag begins being inflated in a matter of no more than a few milliseconds with gas produced or supplied by a device commonly referred to as "an inflator."

Many types of inflator devices have been disclosed in the art for inflating an airbag for use in inflatable restraint systems. Prior art inflator devices include compressed stored gas inflators, pyrotechnic inflators and hybrid inflators. Unfortunately, each of these types of inflator devices is subject to certain disadvantages.

For example, stored gas inflators typically require the storage of a relatively large volume of gas at relatively high pressures. As a result of high gas storage pressures, the walls of the gas storage chambers of such inflators are typically relatively thick for increased strength. The combination of large volume and thick walls results in relatively heavy and bulky inflator designs.

With respect to pyrotechnic inflators wherein gas is derived from a combustible gas generating material, i.e., a pyrotechnic, such gas generating materials can typically produce various undesirable combustion products, including various solid particulate materials. The removal of such solid particulate material, such as by the incorporation of various filtering devices within or about the inflator, undesirably increases inflator design and processing complexity and can increase the costs associated therewith. In addition, the temperature of the gases emitted from such inflator devices can typically vary between about 500° F. (260° C.) and 1200° F. (649° C.), dependent upon numerous interrelated factors including the desired level of inflator performance, as well as the type and amount of gas generant material used therein, for example. Consequently, airbags used in conjunction with such inflator devices are commonly constructed of or coated with materials which are resistant to such high temperatures. For example, an airbag such as constructed of nylon fabric, in order to resist burn through as a result of exposure to such high temperatures, can be prepared such that the nylon fabric airbag material is coated with neoprene or one or more neoprene coated nylon patches are placed at the locations of the airbag at which the hot gas initially impinges. As will be appreciated, such specially fabricated or prepared airbags typically are more costly to manufacture and produce.

Hybrid inflators, wherein airbag inflating gas results from a combination of stored compressed gas and combustion of a pyrotechnic gas generating material, also typically result in a gas having a relatively high particulate content.

Commonly assigned U.S. Pat. No. 5,470,104, Smith et al., issued Nov. 28, 1995, and U.S. Pat. No. 5,494,312, Rink, issued Feb. 27, 1996, disclose a new type of inflator device which utilizes a fuel material in the form of a fluid, e.g., in the form of a gas, liquid, finely divided solid, or one or more combinations thereof, has been developed. For example, in one such inflator device, the fluid fuel is burned to produce gas which contacts a quantity of stored pressurized gas to produce inflation gas for use in inflating the respective inflatable device.

While such type of inflator can successfully overcome, at least in part, some of the problems associated with the prior types of inflator devices, there is a continuing need and demand for a safe, simple, effective and economical apparatus and technique for inflating an inflatable device such as an airbag.

Further, there is a need and demand for additional new inflator designs to meet the inflatable restraint system design specifications for particular vehicular applications.

Also, there is a need and demand for airbag inflators which: reduce or minimize handling concerns; produce relatively low temperature, non-harmful inflation gases; can be of compact size to minimize space requirements and wherein the materials, which upon activation of the inflator, serve to produce or form gas, avoid or minimize the risks or dangers of degradation (thermal or otherwise) over time as the inflator awaits activation.

In addition, as at least some of the above-identified types of prior art inflator devices require or rely on multiple materials for inflation gas generation or production, such devices can require increased expense and consideration for preparation and handling of such materials.

Thus there is a need and demand for inflator devices which reduce or simplify the number or types of gas generating or producing materials required therein and can thus assist in simplifying and reducing the costs and expenses associated with the manufacture and production of the inflator devices.

Still further, many of the above-identified types of prior art inflator devices require or rely on one or more combustion reactions for gas generation or production. Combustion reactions typically involve steep temperature gradients and luminescence, both of which may normally be considered problematic in inflatable restraint system inflator design.

Typically, combustion of a fuel and an oxidant will only occur under certain appropriate conditions. It is often convenient to use the terms "limit of flammability" and "equivalence ratio" when seeking to express the ability of a combination of reactants to undergo a combustion reaction. A mixture of fuel and oxidant, with or without the presence of inert materials such as may serve as diluent, will normally only ignite and burn within a certain range of equivalence ratios. If certain parameters of the mixture are changed in sufficient magnitude, the mixture becomes non-flammable. At given operating conditions, the flammability operation parameter at which there is just insufficient fuel to form a flammable mixture is often referred to as the "lean limit" of flammability. Conversely, the flammability operation parameter at which, for given operating conditions, there is just an excess of fuel to form a flammable mixture is often referred to as the "rich limit" of flammability. Since a stoichiometric combustion reaction ratio can be defined for any fuel and oxidant mixture, the flammability limits for a mixture of fuel and oxidant can be expressed in terms of the equivalence ratio. The equivalence ratios at the flammability limits are referred to as the "critical equivalence ratios."

Typically, the flammability limits for a particular fuel and oxidant mixture are strongly dependent on the pressure and temperature of the mixture. Generally, the rich limit of flammability increases greatly with increasing pressure and temperature. On the other hand, however, the lean limit of flammability decreases relatively only sightly with increasing pressure.

In addition, since combustion generally involves the reaction of a fuel with an oxidant, the relationship (e.g., contact, placement and storage) of the fuel and oxidant typically must be carefully controlled to result in acceptable, repeatable performance.

Thus there is a need and demand for inflator devices and methods of gas production which avoid or reduce the problems associated with reliance on combustion reactions for gas production.

SUMMARY OF THE INVENTION

A general object of the invention is to provide an improved apparatus and method for inflating an inflatable device such as an inflatable vehicle occupant restraint for use in such systems.

A more specific objective of the invention is to overcome one or more of the problems described above.

The general object of the invention can be attained, at least in part, through an inflatable device inflation apparatus which includes a first chamber and an initiator. The first chamber includes, as contents, at least one gas source material which, upon initiation from the initiator, undergoes decomposition to form decomposition products including at least one gaseous decomposition product used to inflate the device.

The prior art fails to disclose an apparatus or method for inflating an inflatable device which apparatus and method uses a material which produces or forms gas (especially a gas at elevated temperature) through decomposition, as opposed to combustion, of a fluid source material.

The invention further comprehends an inflatable device inflation apparatus which includes first and second chambers and an initiator to initiate the decomposition of at least one gas source material in the first chamber.

The first chamber has contents which include the at least one gas source material which undergoes decomposition to produce decomposition products including at least one gaseous decomposition product used to inflate the inflatable device. The first chamber is adapted to open when a predetermined increase in pressure within the first chamber is realized, whereby at least a portion of the decomposition products including at least a portion of the at least one gaseous decomposition product is released from the first chamber.

Upon the opening of the first chamber, the second chamber, which chamber contains a supply of pressurized stored gas, is in fluid communication with the first chamber and the decomposition products released from the first chamber mix with the pressurized stored gas to produce inflation gas. The mixing of the decomposition products released from the first chamber with the pressurized stored gas to produce inflation gas increases the temperature and pressure within the second chamber. The second chamber is adapted to open when a predetermined increase in pressure within the second chamber is realized, whereby at least a portion of the inflation gas is released from the second chamber to inflate the device.

The invention also comprehends a multiple level airbag inflator having a first chamber which contains at least one gas source material adapted to undergo decomposition upon actuation to form decomposition products including at least one gaseous decomposition product for use in inflating an inflatable device. The inflator also includes an initiator and a chamber opening device. The initiator initiates the decomposition of the at least one gas source material in the first chamber. The chamber opening device is adapted to selectively open a chamber of the inflator whereby the contents of the selectively opened chamber at least in part are released from the inflator.

The invention still further comprehends methods for inflating an inflatable safety device in a vehicle.

One such method involves the step of decomposing at least one gas source material in a first chamber to form decomposition products including at least one gaseous decomposition product. Inflation gas comprising at least a portion of the at least one gaseous decomposition product is then released from the apparatus to inflate the inflatable safety device.

Another method for inflating an inflatable safety device in a vehicle, in accordance with the invention, involves the step of decomposing at least one gas source material in a first chamber to form decomposition products including at least one gaseous decomposition product, with the decomposition increasing the temperature and pressure within the first chamber.

The first chamber opens when a predetermined increase in the pressure within the first chamber is realized. Upon opening, at least a portion of the decomposition products including at least a portion of the at least one gaseous decomposition product is released from the first chamber into a second chamber. The second chamber contains a supply of pressurized stored gas with which the at least a portion of the gaseous decomposition product released from the first chamber mixes to form inflation gas. The mixing of the gaseous decomposition product with the pressurized stored gas increases the temperature and pressure within the second chamber.

The second chamber opens when a predetermined increase in the pressure within the second chamber is realized to release the inflation gas from the second chamber to inflate the inflatable safety device.

The invention also comprehends a method of operation of a multiple level air bag inflator which includes at least one chamber. More specifically, the inflator includes a first chamber containing at least one gas source material adapted to undergo decomposition upon actuation to form decomposition products including at least one gaseous decomposition product for use in inflating an inflatable device. The inflator also includes an initiator and a chamber opening device. The initiator serves to initiate the decomposition of the at least one gas source material in the first chamber. The chamber opening device is adapted to selectively open a chamber of the inflator whereby the contents of the selectively opened chamber at least in part are released from the inflator.

In accordance with this embodiment of the invention, this method includes the step of selectively actuating at least one of the initiator and the chamber opening device.

As used herein, references to "combustion," "combustion reactions" and the like are to be understood to generally refer to the exothermic reaction of a fuel with an oxidant.

References to "decomposition," "decomposition reactions" and the like are to be understood to refer to the splitting, dissociation or fragmentation of a single molecular species into two or more entities.

"Thermal decomposition" is a decomposition controlled primarily by temperature. It will be appreciated that while pressure may, in a complex manner, also influence a thermal decomposition such as perhaps by changing the threshold temperature required for the decomposition reaction to initiate or, for example, at a higher operating pressure change the energy which may be required for the decomposition reaction to be completed, such decomposition reactions remain primarily temperature controlled.

"Exothermic thermal decomposition" is a thermal decomposition which liberates heat.

As identified above, the term "equivalence ratio" (Ø) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\emptyset = (F/O)_A/(F/O)_S$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

As described above, for given temperature and pressure conditions, fuel and oxidant mixtures are flammable over only a specific range of equivalence ratios. Mixtures with an equivalence ratio of less than 0.1 are herein considered non-flammable, with the associated reaction being a decomposition reaction, as opposed to a combustion reaction.

Other objects and advantages will be apparent to those skilled in the art from the following detailed description taken in conjunction with the appended claims and drawings.

DETAILED DESCRIPTION OF THE INVENTION

Figure 1:
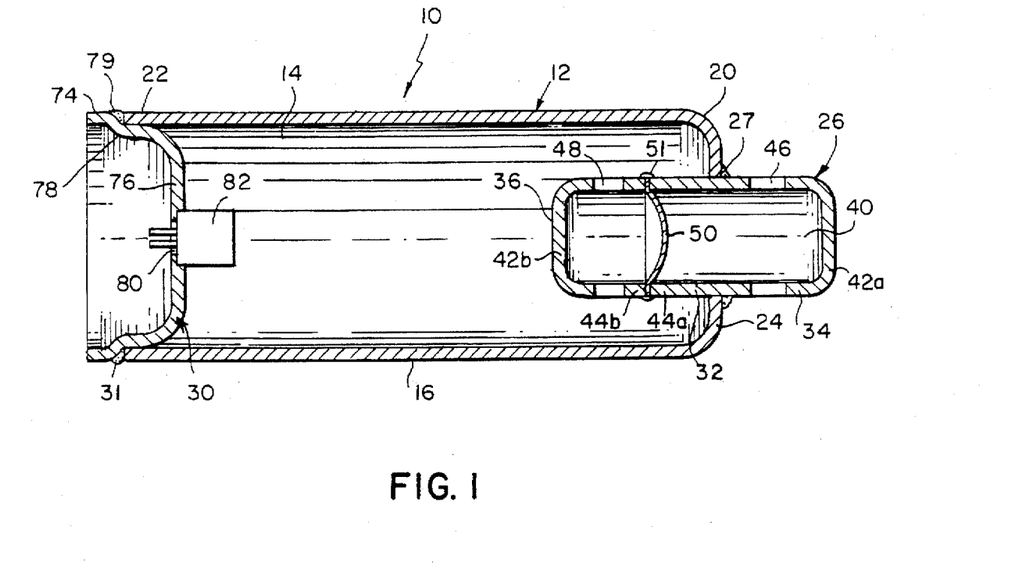
FIG. 1 is a simplified, partially in section, schematic drawing of an airbag inflator which generates inflation gas via a decomposing material, in accordance with one embodiment of the invention.

Referring initially to FIG. 1, there is illustrated an airbag inflator assembly, generally designated by the reference numeral 10. As will be described in greater detail below, the inflator assembly 10 generates inflation gas via a decomposing material. It will be understood that the invention described hereinafter has general applicability to various types or kinds of airbag assemblies including driver side, passenger side, and side impact airbag assemblies for automotive vehicles including vans, pick-up trucks, and particularly automobiles.

The inflator assembly 10 comprises a pressure vessel 12 including a chamber 14 that contains contents including at least one gas source material which undergoes decomposition to form decomposition products including at least one gaseous decomposition product used to inflate an associated inflatable airbag device (not shown). Thus, the chamber 14 is sometimes referred to herein as a "decomposition chamber."

The chamber 14 is defined by an elongated generally cylindrical sleeve 16, having a first end and a second end, 20 and 22, respectively. The first end 20 is partially closed by means of a shoulder portion 24. As shown, the shoulder portion 24 can desirably be integral (i.e., formed continuous with and in one piece) with the sleeve 16.

A diffuser assembly 26 is attached by a circumferential weld 27 in sealing relation to the shoulder portion 24. A decomposition chamber base portion 30 is attached by a circumferential weld 31 in sealing relation to the sleeve second end 22.

The diffuser assembly 26 comprises a generally cylindrical sleeve 32 having a cap portion 34 and a base portion 36 to define a diffuser chamber 40. Each of the diffuser assembly cap and base portions, 34 and 36, respectively, include a closed first end 42a and 42b, respectively, and an open second end 44a and 44b, respectively. The diffuser assembly cap portion 34 includes a plurality of openings 46, adjacent the closed cap first end 42a, for dispensing inflation gas from the inflator assembly into the associated airbag. The diffuser assembly base portion 36 additionally includes a plurality of openings 48, adjacent the closed base first end 42b, for passage of inflation gas from the decomposition chamber 14, into the diffuser chamber 40.

The diffuser assembly cap and base portions, 34 and 36, respectively, are aligned with the open second end of each, i.e., ends 44a and 44b, respectively, being closed by sealing means, e.g., by means of a rupture disc 50 abutting thereagainst. The diffuser assembly rupture disc 50 is joined in sealing relation with the diffuser assembly cap and base portions, 34 and 36, respectively, by means of a circumferential weld 51 at the periphery of the disc 50. In the static state, the disc 50 serves to separate the contents of the decomposition chamber 14 from the airbag.

As will be described in greater detail below, the contents of the decomposition chamber include at least one gas source material which undergoes decomposition to form decomposition products including at least one gaseous decomposition product used to inflate the associated airbag device. The contents of the decomposition chamber are normally preferably held therein at relatively low pressure (e.g., a pressure in the range of about 500 psi to about 1400 psi, preferably in a range of about 650 psi to about 800 psi).

The decomposition chamber base portion 30 includes a base ring 74 with a base cap 76 joined thereto via a base shoulder connecting portion 78. The base shoulder connecting portion 78 serves as a convenient means of locating the decomposition chamber base portion 30 relative to the sleeve 16, as well as providing a location for a circumferential weld 79 whereby the decomposition chamber base portion 30 is attached in sealing relation with the sleeve 16.

The base cap 76 includes an opening 80 therein, wherethrough an initiator device 82 is attached in sealing relation, such as with a weld, crimping or other suitable hermetic seal, within the decomposition chamber 14. In such an assembly, the initiator device can be of any suitable type including: pyrotechnic, bridgewire, spark-discharge, heated or exploding wire or foil, through bulkhead (e.g., an initiator which discharges through a bulkhead such as in the form of a metal hermetic seal), for example. In practice, however, a relatively large heat input such as from the initiator, may be helpful in obtaining a more thorough initiation of the decomposition of various gas source materials, such as nitrous oxide ($N_2O$). In view thereof, as pyrotechnic initiators, as compared to spark-discharge, heated or exploding wire and similar types of initiators, can typically more easily produce such relatively large heat inputs from a relatively small sized initiator device, the practice of the invention with pyrotechnic initiators can be particularly advantageous.

As identified above, the contents of the decomposition chamber include at least one gas source material which undergoes exothermic decomposition to form decomposition products including at least one gaseous decomposition product used to inflate the associated airbag device. A wide variety of gas source materials which undergo decomposition to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

The decomposable gas source materials used in the practice of the invention are preferably:

a.) non-toxic and non-corrosive both in the pre- and post-decomposition states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the decomposition reaction, and which catalysts may be difficult to remove or handle; and d.) form products of decomposition which do not contain undesirable levels of undesirable species, such as carbonaceous material (e.g., soot), $CO_x$, $NO_x$, $NM_3$, for example.

Thus, in view of manufacture, storage, and handling concerns, a preferred decomposable gas source material for use in the practice of the subject invention, at this time, is believed to be nitrous oxide ($N_2O$).

In accordance with the chemical reaction (1) identified below, upon the decomposition of nitrous oxide, the decomposition products ideally are nitrogen and oxygen:

$$2N_2O = 2N_2 + O_2 \quad (1)$$

Nitrous oxide is a now preferred decomposable gas source material as, in practice, nitrous oxide is generally non-toxic and non-corrosive. Further, nitrous oxide, as compared to gases such as air, nitrogen and argon, liquifies relatively easily at ambient temperatures. Additionally, nitrous oxide is relatively inert up to temperatures of about 200° C or more. As a result, nitrous oxide is desirably relatively safe to handle, thermally stable, facilitates storage, and alleviates manufacturing concerns.

It is to be understood that the decomposable gas source material can, for example and as desired, be stored in a gaseous, liquid or multi-phase form (i.e., partially gaseous and partially liquid mixture). The premium on size generally placed on modern vehicle design, however, results in a general preference for smaller sized airbag inflators. In view thereof and the fact that the densities for such gas source materials are significantly greater when in a liquid, rather than gaseous form, storage of such materials primarily in a liquid form will typically be preferred.

It is also to be understood that while such decomposable gas source material can be contained within the decomposition chamber in a pure form (e.g., such that the chamber contents include no more than minor levels of other materials, such as air as may be present in the decomposition chamber prior to being filled with the decomposable gas source material), it may be preferred to include an inert gas therewith. For example, an inert gas such as helium can be included with the decomposable gas source material to facilitate leak checking of the inflator apparatus or, more specifically, of the decomposition chamber thereof. Alternatively or in addition, an inert gas, such as argon and helium, for example, or mixture of such inert gases, can be included to supplement the gas produced or formed upon the decomposition of the decomposable gas source material.

In addition, the decomposition chamber can, if and as desired, also include a decomposition sensitizer material to promote or accelerate the rate of the decomposition reaction. Such sensitizer materials are typically hydrogen-bearing materials added to the decomposable gas source material in small amounts. Specifically, the sensitizer material is preferably added to the decomposable gas source material in an amount below the flammability limits for the content mix, such that the contents of the decomposition chamber are preferably at an equivalence ratio of less than 0.1. At such low relative amounts, the chamber contents are essentially non-flammable and thus combustion and the formation of combustion products are practically avoided.

Hydrogen bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen bearing sensitizer materials useable in the practice of the invention include paraffins, olefins, cycloparaffins and alcohols. Molecular hydrogen ($H2$), which does not result in the formation of carbon oxides such as carbon monoxide or carbon dioxide, has been found to be quite effective as a sensitizer and is an especially preferred hydrogen bearing sensitizer material for use in the practice of the invention.

In operation, such as upon the sensing of a collision, an electrical signal is sent to the initiator device 82. The initiator device 82 functions and, when it is a pyrotechnic initiator, discharges high temperature combustion products into the decomposition chamber 14 and the contents thereof, which in a preferred embodiment includes primarily liquid-phase $N_2O$. The large heat addition results in commencement of the exothermic thermal decomposition of the $N_2O$. In this thermal decomposition, the $N_2O$ begins to breakdown into smaller molecular fragments. As the $N_2O$ molecules fragment, the associated release of energy results in further heating of the remaining mixture. Additionally, as the decomposition process proceeds, heating of the mixture results in conversion of at least some of the $N_2O$ from a liquid to a gaseous phase. Thus, this decomposition results in not only both the release of heat and the formation of gaseous decomposition products but also an increase in gaseous species due to the conversion of $N_2O$ from a liquid to a gaseous phase. The increase both in temperature and the relative amount of gaseous products within the decomposition chamber 14 results in a rapid pressure rise within the decomposition chamber.

When the gas pressure within the decomposition chamber 14 exceeds the structural capability of the rupture disc 50, the disc ruptures or otherwise permits the passage of the inflation gas through the diffuser base portion 36 and into the diffuser cap portion 34 and thus allows this inflation gas to vent through the openings 46 into the associated airbag assembly.

Thus, the invention provides an inflator device and associated method for inflating an inflatable device which reduce or minimize handling concerns and provide inflation gas which desirably is harmless, non-toxic and at relatively low temperature when exiting from the inflator assembly. Further, as the inflator assembly 10 illustrated in FIG. 1 in its simplest form includes only a single stored component (i.e., the decomposable gas source material, $N_2O$) in a relatively small-sized device, such an inflator assembly and adaptations thereof due to factors such as simplicity and low cost, can find wide utility and use.

It will be appreciated that the exothermic decomposition of $N_2O$, while primarily resulting in the formation of $N_2$ and $O_2$, can also produce some comparatively undesirable products, such as NO and $NO_2$, albeit in relatively small amounts as compared to the amount of $N_2O$ originally present in the chamber. In addition, some of the $N_2O$ may not decompose and may be found in the inflation gas released from the inflator assembly.

Figure 2:
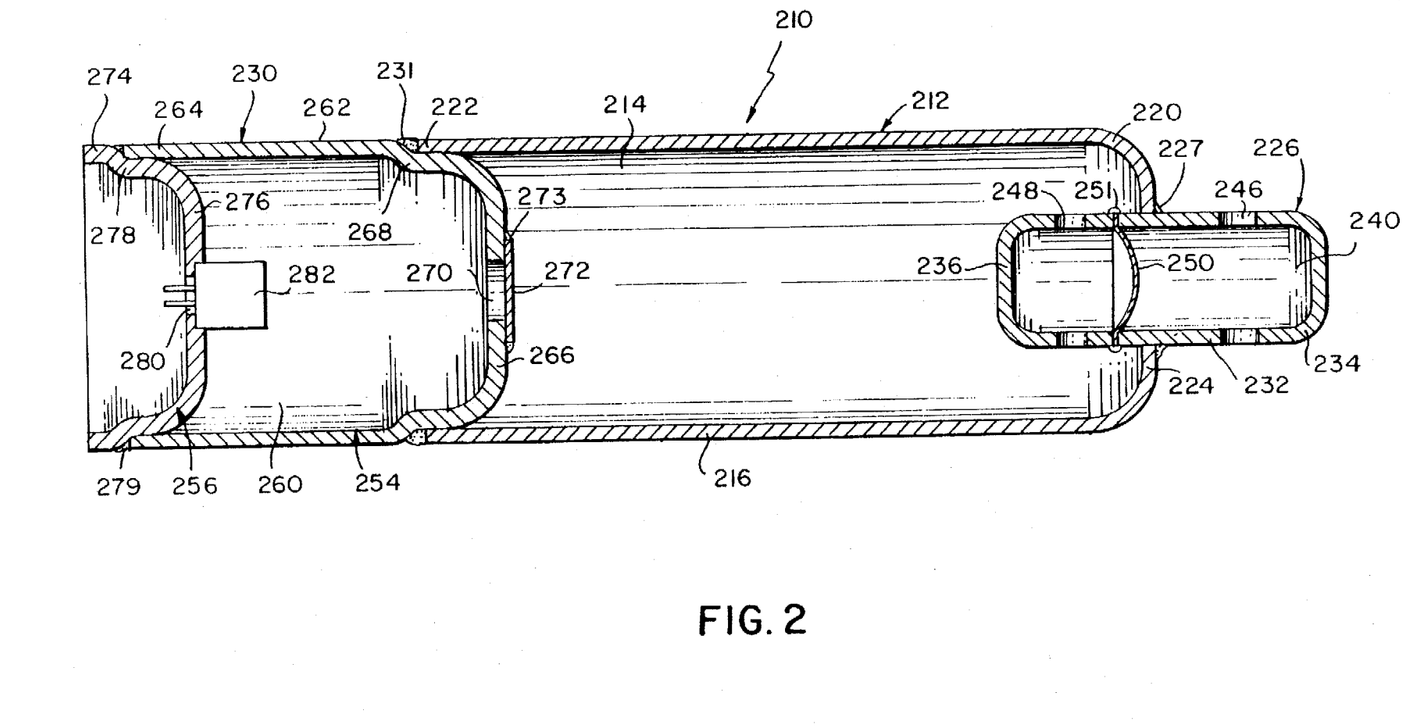
FIG. 2 is a simplified, partially in section, schematic drawing of an airbag inflator which generates inflation gas via a decomposing material, in accordance with an alternative embodiment of the invention.

FIG. 2 illustrates an airbag inflator assembly 210 in accordance with an alternative embodiment of the invention. The inflator assembly 210 comprises a pressure vessel 212 including a storage chamber 214 that is filled and pressurized with an inert gas such as argon or nitrogen or a mixture of such inert gases to a pressure typically in the range of 2000–5000 psi. Thus, the chamber 214 is sometimes referred to herein as a "gas storage chamber."

The chamber 214 is defined by an elongated generally cylindrical sleeve 216, having a first end 220 and a second end 222. The first end 220 is partially closed by means of a shoulder portion 224. As shown, the shoulder portion 224 can desirably be integral (i.e., formed continuous with and in one piece) with the sleeve 216.

A diffuser assembly 226 is attached by a circumferential weld 227 in sealing relation with the shoulder portion 224. A decomposition chamber assembly 230 is attached by a circumferential weld 231 in sealing relation with the sleeve second end 222.

The diffuser assembly 226, like the diffuser assembly 26 described above, comprises a generally cylindrical sleeve 232 having a cap portion 234 and a base portion 236 to define a diffuser chamber 240. The diffuser assembly cap portion 234 includes a plurality of openings 246 for dispensing inflation gas from the inflator assembly into an airbag assembly (not shown). The diffuser assembly base portion 236 additionally includes a plurality of openings 248 for passage of inflation gas from the storage chamber 214, into the diffuser chamber 240.

The diffuser assembly cap and base portions, 234 and 236, respectively, are aligned and closed by sealing means, e.g., by means of a rupture disc 250 abutting thereagainst and in sealing relation therewith by means of a circumferential weld 251 at the periphery of the disc 250. In the static state, the disc 250 serves to separate the contents of the storage chamber 214 from the airbag.

The decomposition chamber assembly 230 comprises a cap portion 254 and a base portion 256 to define a decomposition chamber 260. The contents of the decomposition chamber 260, similar to the contents of the decomposition chamber 14, described above, include at least one gas source material which undergoes decomposition to form decomposition products including at least one gaseous decomposition product used to inflate the associated airbag device. Again and as described above, the decomposable gas source material can be contained within the decomposition chamber in a pure form (e.g., such that the chamber contents include only the decomposable gas source material) or, as may be preferred, the chamber may also contain an inert gas.

The decomposition chamber cap portion 254 includes a sleeve 262, constituting a side wall 264 with a dome 266 joined thereto via a cap shoulder connecting portion 268. The decomposition chamber dome 266 includes an orifice, referred to herein as a gas exit opening 270. The gas exit opening 270 is normally closed by sealing means, e.g., by means of a rupture disc 272 joined in sealing relation with the decomposition chamber dome 266 by means of a circumferential weld 273 at the periphery of the disc 272.

The decomposition chamber dome 266 is generally designed to withstand the internal pressures generated upon the decomposition of the decomposable material within the decomposition chamber 60. In the static state, the disc serves in maintaining the gas storage chamber 214 in a sealed condition.

The decomposition chamber base portion 256 includes a base ring 274 with a base cap 276 joined thereto via a base shoulder connecting portion 278. The base shoulder connecting portion 278 serves as a convenient means of locating the decomposition chamber base portion 256 relative to the decomposition chamber sleeve 262, as well as providing a location for a circumferential weld 279 whereby the decomposition chamber assembly base portion 256 is attached in sealing relation to the decomposition chamber cap portion 254.

The base cap 276 includes an opening 280 therein, wherethrough an initiator device 282 is attached in sealing relation, such as with a weld, crimping or other suitable hermetic seal, within the decomposition chamber 230.

In operation, such as upon the sensing of a collision, an electrical signal is sent to the initiator device 282. The initiator device 282 functions and, when it is a pyrotechnic initiator, discharges high temperature combustion products into the decomposition chamber 230 and the contents thereof, which in a preferred embodiment includes primarily liquid-phase $N_2O$. The large heat addition results in commencement of the thermal decomposition of the $N_2O$. In this thermal decomposition, the $N_2O$ begins to breakdown into smaller molecular fragments. As the $N_2O$ molecule is fragmented, the associated release of energy results in further heating of the remaining mixture. Additionally, as the thermal decomposition process proceeds, heating of the mixture results in conversion of at least some of the $N_2O$ from a liquid to a gaseous phase. Thus, this decomposition results in not only both the release of heat and the formation of gaseous decomposition products but also an increase in gaseous species due to the conversion of $N_2O$ from a liquid to a gaseous phase. The increase both in temperature and the relative amount of gaseous products within the decomposition chamber 230 results in a rapid pressure rise in the decomposition chamber.

When the gas pressure within the decomposition chamber 230 exceeds the structural capability of the rupture disc 272, the disc ruptures or otherwise permits the passage of the hot decomposition products through the gas exit opening 270 and into the storage chamber 214. Wherein, the hot decomposition gas expelled from the decomposition chamber 230 mixes with the pressurized gas stored within the separate storage chamber 214 to produce inflation gas for use in inflating the inflatable restraint device, e.g., an airbag. It will be appreciated that augmenting the decomposition product gas with the stored inert gas, in addition to diluting the products of decomposition, also serves to produce an inflation gas having a lower temperature than the decomposition gas alone.

When the gas pressure within the storage chamber 214 exceeds the structural capability of the rupture disc 250, the disc ruptures or otherwise permits the passage of the inflation gas through the diffuser base portion 236 and into the diffuser cap portion 234 and thus allows this inflation gas to vent through the openings 246 into the airbag assembly.

It is to be appreciated that while the inclusion of the inert gas storage chamber 214 in the inflator assembly 210 may increase one or more of the size, complexity and expense of the inflator assembly (as compared to the inflator assembly 10, illustrated in FIG.1), in particular inflator applications, there may be at least several competing reasons which may favor such inclusion.

For example, as the products of the exothermic decomposition are cooled by mixing with inert gas within such a storage chamber, the inclusion of such an inert gas storage chamber can better ensure that the gas released from such an inflator assembly will be at a relatively low temperature, e.g., preferably lower than 1100° K., more preferably with a maximum temperature of no more than about 675° K. to about 775° K.

Further, as the products of the exothermic decomposition are diluted by mixing with the inert gas within such a storage chamber, the inclusion of such an inert gas storage chamber can better ensure that the gas released from such an inflator assembly will have no more than acceptable lower concentrations of decomposition products such as $O_2$, $NO$ and $NO_2$, in the case of decomposition of $N_2O$.

Figure 3:
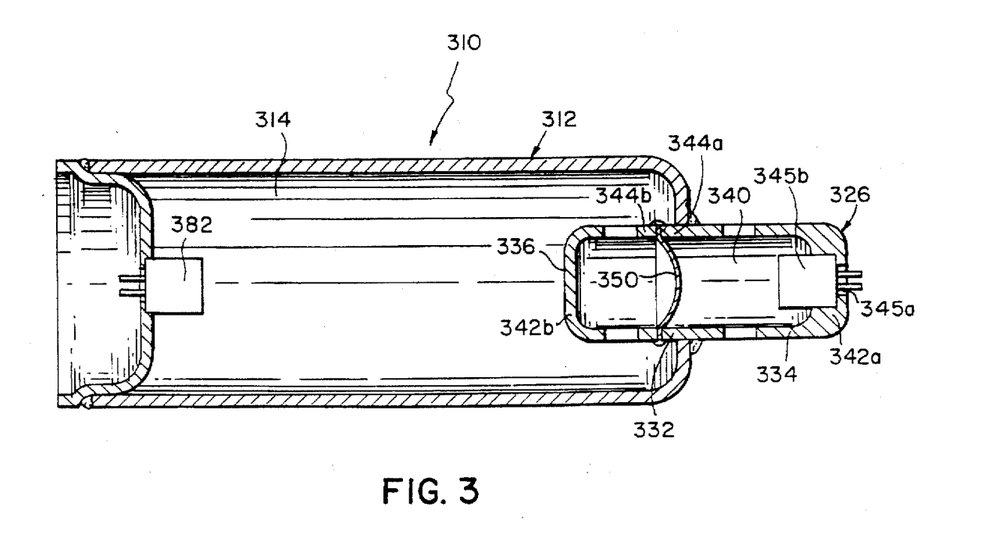
FIG. 3 is a simplified, partially in section, schematic drawing of a multiple level airbag inflator which generates inflation gas via a decomposing material, in accordance with one embodiment of the invention.

FIG. 3 illustrates, in accordance with one embodiment of the invention, a multiple level airbag inflator assembly, designated by the reference numeral 310. The multiple level airbag inflator assembly 310 is generally similar to the inflator assembly 10, described above, and includes a pressure vessel 312 including a chamber 314 that contains contents including at least one gas source material which undergoes decomposition to form decomposition products including at least one gaseous decomposition product used to inflate an associated inflatable airbag device (not shown).

The inflator assembly 310 also includes a diffuser assembly 326 which includes a generally cylindrical sleeve 332 having a cap portion 334 and a base portion 336 to define a diffuser chamber 340. Each of the diffuser assembly cap and base portions, 334 and 336, respectively, include a first end 342a and 342b, respectively, and an open second end 344a and 344b, respectively. Included in the diffuser assembly 326 is a rupture disc 350 which, in the static state, serves to separate the contents of the decomposition chamber 314 from the airbag. Within the decomposition chamber 314 there is also included an initiator device 382.

The inflator assembly 310, however, differs in that the first end 342a of the cap portion 334 includes an opening 345a therein, wherethrough a chamber opening device 345b is attached by a suitable means of attachment such as by crimping or the use of a weld.

The chamber opening device 345b, similar to the initiator device 382, can also be of a pyrotechnic type and can, if desired, include therewith a projectile which, upon actuation of the opening device 345b, is projected at the rupture or otherwise open the disc 350 to begin affecting the release of the contents of the decomposition chamber 314.

OPERATION

Through the proper timing and sequencing of the actuation or firing of the chamber opening device 345b and the decomposition chamber initiator device 382, a wide range of response can be obtained from an airbag system using the multiple level airbag inflator assembly 310.

A. MODE 1

In certain circumstances, such as, for example, a high speed collision in which the occupant is seated in the proper position to be properly cushioned by the airbag, it may be desired that the inflator 310 be operated such that only the initiator 382, and not the chamber opening device 345b, is actuated or fired.

In such operation, the inflator 310 is operated in a fashion similar to that of inflator 10 shown in FIG. 1 and described above, with the initiator device 382 being appropriately actuated or fired to discharge high temperature combustion products into the decomposition chamber 314 and the contents thereof, which in a preferred embodiment includes primarily liquid-phase $N_2O$. The large heat addition results in commencement of the exothermic thermal decomposition of the $N_2O$. In this thermal decomposition, the $N_2O$ begins to breakdown into smaller molecular fragments. As the $N_2O$ molecule is fragmented, the associated release of energy results in further heating of the remaining mixture. Additionally, as the decomposition process proceeds, heating of the mixture results in conversion of at least some of the $N_2O$ from a liquid to a gaseous phase. Thus, this decomposition results in not only both the release of heat and the formation of gaseous decomposition products but also an increase in gaseous species due to the conversion of $N_2O$ from a liquid to a gaseous phase. The increase both in temperature and the relative amount of gaseous products within the decomposition chamber 314 results in a rapid pressure rise in the decomposition chamber.

When the gas pressure within the decomposition chamber 314 exceeds the structural capability of the rupture disc 350, the disc ruptures or otherwise permits the passage of the inflation gas through the diffuser assembly 326 and into the associated airbag assembly.

B. MODE 2

In circumstances where, for example, a relatively more gradual deployment of an associated airbag is desired or sought, however, the inflator assembly 310 can be operated such that the opening device 345b is fired or actuated to rupture or otherwise open the disc 350 to begin affecting release of the contents of the decomposition chamber 314, with the initiator device 382 being actuated or fired only at some selected time interval subsequent to the opening of the disc 350 to initiate decomposition of remaining decomposable material contain therewithin.

By appropriately selectively varying the time interval between the opening of the disc 350 and the actuating or firing of the initiator device 382, a wide range of responses can be obtained with a single airbag system designed with an inflator assembly in accordance with the invention.

C. MODE 3

In this mode of operation, the opening device 345b, such as a pyrotechnic-containing device, is used to not only rupture or otherwise open the disc 350 to begin affecting the release of the contents of the decomposition chamber 314, but also, as desired, to release high temperature combustion products into the decomposition chamber 14 and the contents thereof to thereby promote or advance the decomposition of the decomposable material contained therein.

In such operation, the opening device 345b can be fired or actuated to open the disc 350 and discharge high temperature combustion products into the decomposition chamber 314 and the contents thereof, at a selected time interval prior to the subsequent firing or actuation of the initiator device 382 or, if desired, without the subsequent firing or actuation of the initiator device 382.

Figure 4:
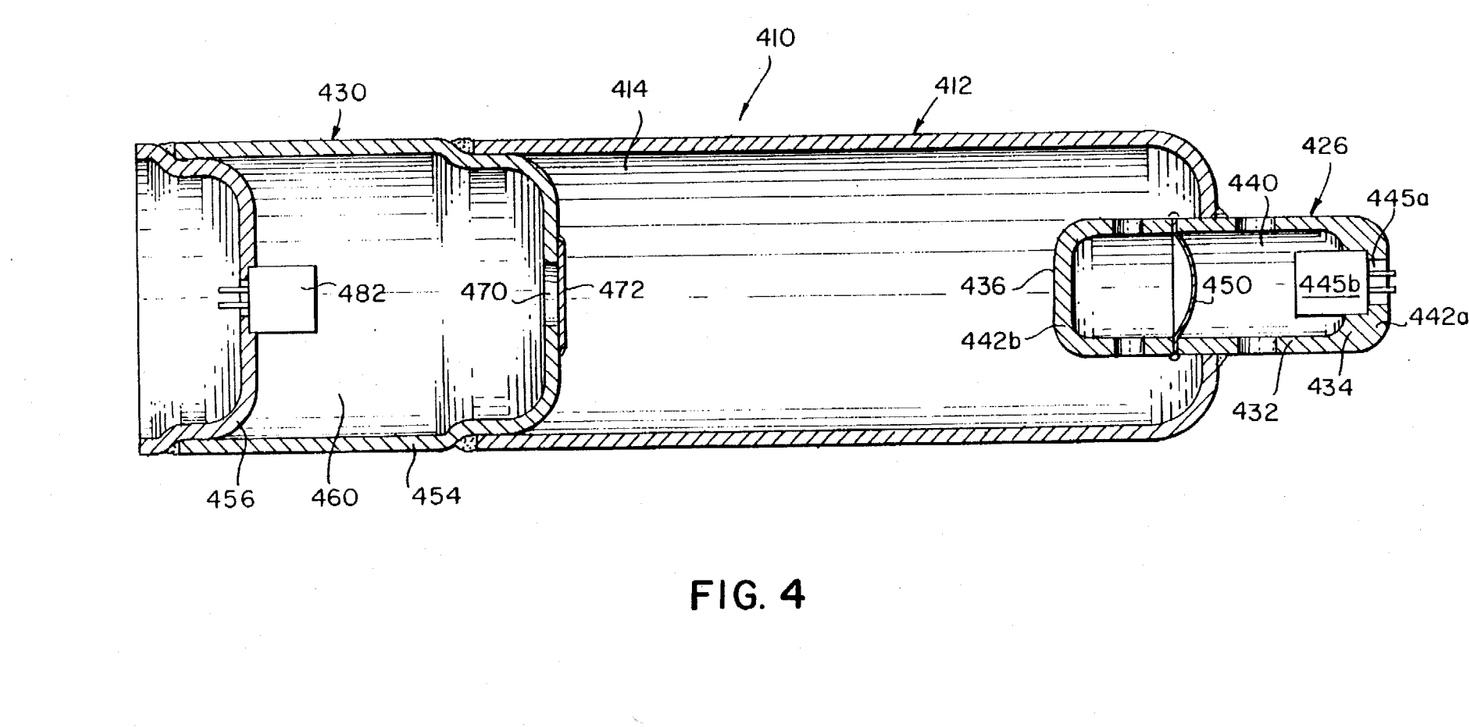
FIG. 4 is a simplified, partially in section, schematic drawing of a multiple level airbag inflator which generates inflation gas via a decomposing material, in accordance with an alternative embodiment of the invention.

FIG. 4 illustrates a multiple level airbag inflator assembly, designated by the reference numeral 410, in accordance with an alternative embodiment of the invention.

The multiple level airbag inflator 410 is generally similar to the inflator assembly 210, described above, and includes a pressure vessel 412 including a storage chamber 414 that is filled and pressurized with an inert gas such as argon or nitrogen or a mixture of such inert gases to a pressure typically in the range of 2000–4000 psi.

The inflator assembly 410 also includes a diffuser assembly 426 and a decomposition chamber assembly 430. The diffuser assembly 426 includes a generally cylindrical sleeve 432 having a cap portion 434 and a base portion 436 to define a diffuser chamber 440. Each of the diffuser assembly cap and base portions, 434 and 436, respectively, include a first end 442a and 442b, respectively. Included in the diffuser assembly 426 is a rupture disc 450 which, in the static state, serves to separate the contents of the stored gas chamber 414 from the airbag (not shown).

The decomposition chamber assembly 430 includes a cap portion 454 with a gas exit opening 470 normally closed by means of a rupture disc 472. The decomposition chamber assembly 430 also includes a base portion 456 to define a decomposition chamber 460 and includes therewithin an initiator device 482.

The inflator assembly 410, however, differs in that the first end 442a of the cap portion 434 includes an opening 445a therein, wherethrough a gas storage chamber opening device 445b is attached by a suitable means of attachment such as by crimping or the use of a weld.

The gas storage chamber opening device 445b, similar to the initiator device 482, can also be of a pyrotechnic type and can, if desired, include therewith a projectile which, upon actuation of the opening device 445b, is projected at the rupture or otherwise open the disc 450 to affect release of the gas from the stored gas chamber 414.

OPERATION

Through the proper timing and sequencing of the actuation or firing of the gas storage chamber opening device 445b and the decomposition chamber initiator device 482, a wide range of response can be obtained from an airbag system using the multiple level fluid fuel-containing airbag inflator described herein.

A. MODE 1

The inflator 410 can be operated such that only the gas storage chamber opening device 445b, and not the initiator 482, is actuated or fired, with the so operated inflator solely releasing the relatively cold, inert gas stored in the gas storage chamber 414.

B. MODE 2

Under different circumstances, such as, for example, a high speed collision in which the occupant is seated in the proper position to be properly cushioned by the airbag, it can be advantageous for the inflator 410 to be operated such that only the initiator 482, and not the gas storage chamber opening device 445b, is actuated or fired. With such operation, no stored inert gas is released early (e.g., prior to initiation of the decomposition of the at least one decomposable gas source material within the decomposition chamber 460). Consequently, such operation would typically result in a relatively steep inflation gas pressure rise rate for the inflator, in turn increasing the rapidity with which the corresponding airbag will become fully inflated.

In such operation, actuation of the initiator device 482 results in the discharge therefrom of sufficient combustion products to initiate the decomposition of the at least one decomposable gas source material held within the decomposition chamber 460, resulting in a rapid pressure rise within the decomposition chamber 460. When the gas pressure within the decomposition chamber 460 exceeds the structural capability of the rupture disc 472, the disc ruptures or otherwise permits the passage of the hot gas through the gas exit opening 470 and into the storage chamber 414. Wherein, the hot decomposition gas expelled from the decomposition chamber 460 mixes with the pressurized gas stored within the separate storage chamber 414 to produce inflation gas for use in inflating the inflatable restraint device, e.g., an airbag. It will be appreciated that augmenting the decomposition gas products with stored inert gas can produce an inflation gas having both a lower temperature and reduced concentration of undesirable products, such as $NO$ and $NO_2$, as compared to the decomposition gas alone.

When the gas pressure within the storage chamber 414 exceeds the structural capability of the rupture disc 450, the disc ruptures or otherwise permits the passage of the inflation gas through the diffuser base portion 436 and into the diffuser cap portion 434 and thus allows this inflation gas to vent into the airbag assembly.

C. OTHER

In other circumstances, the inflator 410 can be operated such that both the initiator device 482 and the gas storage chamber opening device 445b are both actuated or fired, with the actuation or firing of each being in a predetermined selected sequence and time interval, such as described above relative to the second and third modes of operation relative to the inflator assembly 310.

Figure 5:
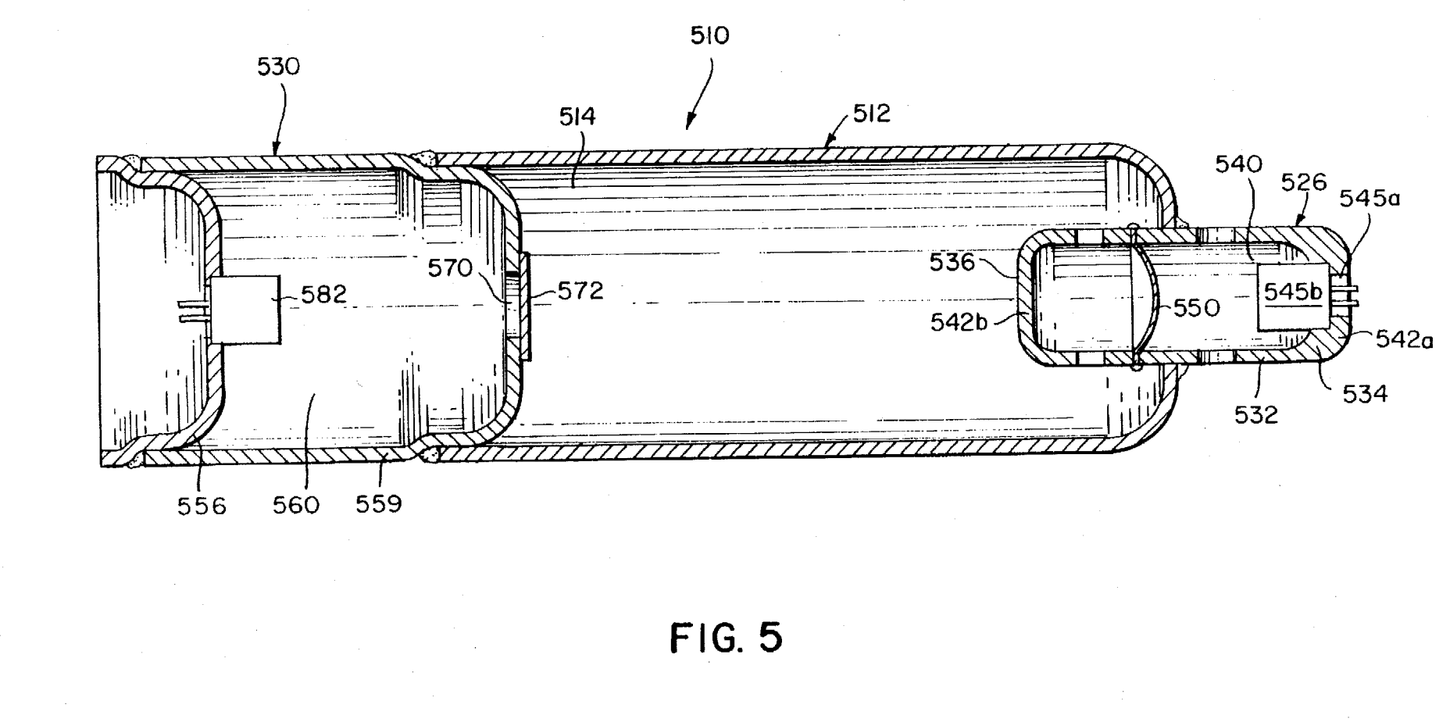
FIG. 5 is a simplified, partially in section, schematic drawing of a multiple level airbag inflator which generates inflation gas via a decomposing material, in accordance with yet another alternative embodiment of the invention.

FIG. 5 illustrates a multiple level airbag inflator assembly, designated by the reference numeral 510, in accordance with another alternative embodiment of the invention.

The multiple level airbag inflator assembly 510 is generally similar to the inflator assembly 410, described above, and includes a pressure vessel 512 including a chamber 514, a diffuser assembly 526 and a decomposition chamber assembly 530. The diffuser assembly 526 includes a generally cylindrical sleeve 532 having a cap portion 534 and a base portion 536 to define a diffuser chamber 540. Each of the diffuser assembly cap and base portions, 534 and 536, respectively, include a first end 542a and 542b, respectively. Included in the diffuser assembly 526 is a rupture disc 550 which, in the static state, serves to separate the contents of the chamber 514 from the airbag (not shown).

The decomposition chamber assembly 530 includes a cap portion 554 with a gas exit opening 570 normally closed by means of a rupture disc 572. The decomposition chamber assembly 530 also includes a base portion 556 to define a decomposition chamber 560 and includes therewithin an initiator device 582.

In addition, the first end 542a of the cap portion 534 includes an opening 545a therein, wherethrough an initiator device 545b is attached by a suitable means of attachment such as by crimping or the use of a weld.

The initiator device 545b, similar to the initiator device 582, can also be of a pyrotechnic type and can, if desired, include therewith a projectile which, upon actuation of the initiator device 545b, is projected at the rupture or otherwise open the disc 550 to begin affecting the release of the contents of the chamber 514.

The inflator assembly 510, however, differs from the inflator assembly 410 in that the chamber 514, rather than being filled and pressurized with an inert gas such as argon or nitrogen, contains an additional supply of at least one gas source material which undergoes decomposition to form decomposition products including at least one gaseous decomposition product used to inflate the associated airbag device. The gas source material contained in the chamber 514 can be appropriately selected from the various types of such materials discussed above. Further, it is to be understood that the gas source material contained in the chamber 514 can, as desired, be the same or different from that contained in the decomposition chamber 560.

In such an inflator assembly, the chamber 514 can serve as an additional decomposition chamber with actuation of the initiator device 545b, e.g., a pyrotechnic initiator with or without an associated projectile, resulting in opening of the rupture disc 550 and the discharge of high temperature combustion products from the initiator device 545b into the chamber 514 and the contents thereof, which in a preferred embodiment includes primarily liquid-phase $N_2O$. The large heat addition results in commencement of the exothermic thermal decomposition of the $N_2O$.

OPERATION

It will be appreciated that through the proper timing and sequencing of the actuation or firing of the initiator device 545b and the initiator device 582, a wide range of response can be obtained from an airbag system using the multiple level airbag inflator 510 described herein.

For example, as conditions warrant, the initiator devices 545b and 582 can be actuated or fired in series, one after the other in whichever order is desired or substantially simultaneously.

The present invention is described in further detail in connection with the following examples which illustrate/ simulate various aspects involved in the practice of the invention. It is to be understood that all changes that come within the spirit of the invention are desired to be protected and thus the invention is not to be construed as limited by these examples.

EXAMPLES

EXAMPLES 1–4

In these examples, the effect on inflator assembly performance of the amount of pyrotechnic in the associated initiator device was investigated.

These examples utilized an inflator assembly similar to the inflator assembly 210, shown in FIG. 2, and sized for a side impact inflation system. In each of these examples, the inflator was deployed so that the gases discharged therefrom were contained in a 10 liter holding tank. Each example was conducted at ambient temperature (about 20° C.).

The gas storage chamber (214) of the inflator assembly of these examples was of a volume of 1.58 in$^3$ (25.8 cc) and was in each case loaded with 10 grams of a mixture (by volume) of 90% argon and 10% helium such as to have an initial pressure of about 3800 psig (26.2 MPA).

The decomposition chamber (260) was filled with pure nitrous oxide. For each of these examples, the amount of pyrotechnic (ZPP zirconium potassium perchlorate) initiator load (P), the volume of the decomposition chamber (V) and the amount of nitrous oxide (N) placed therewithin are identified below.

| EXAMPLE | P (mg) | V in$^3$ (cc) | N (grams) |
| --- | --- | --- | --- |
| 1 | 225 | 0.47 (7.7) | 7.65 |
| 2 | 275 | 0.37 (6.1) | 5.84 |
| 3 | 400 | 0.37 (6.1) | 5.77 |
| 4 | 225 | 0.47 (7.7) | 7.7 |

Figure 6:
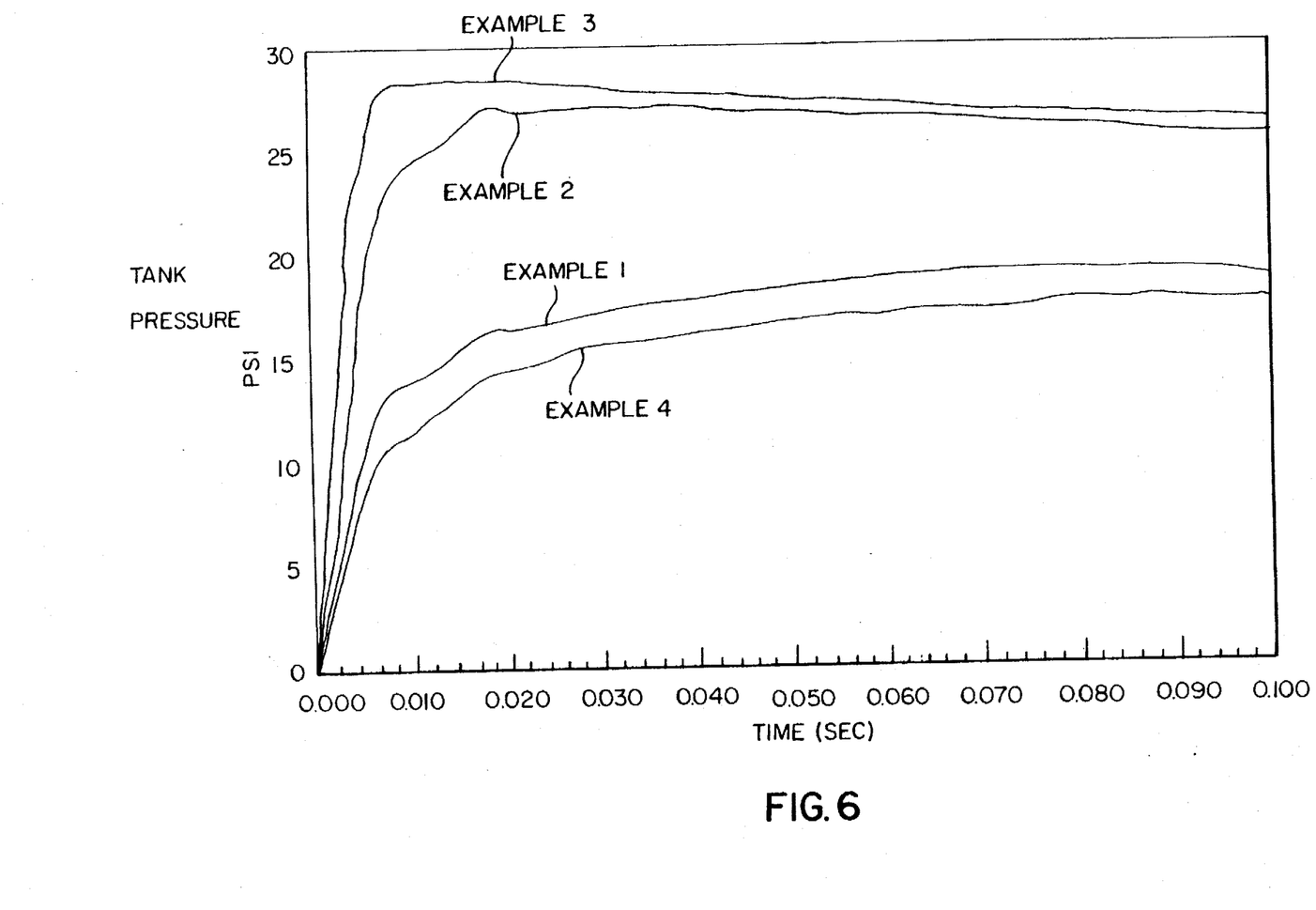
FIG. 6 shows the tank pressure versus time performance obtained in Examples 1–4 using inflator assemblies in accordance with an embodiment of the invention.

FIG. 6 presents the tank pressure as a function of time obtained in Examples 1–4.

DISCUSSION OF RESULTS

The results of these examples were and are significant in several respects.

First, in each case, these examples show that the inflator operated very quickly. For example, in Examples 2 and 3, a peak pressure was reached in about 8 ms. This can be very important for side impact applications where speed of response can be especially significant. Thus, inflator assemblies in accordance with the invention appear well suited for utilization in side impact applications.

Secondly, these examples show that there is a strong relationship between the initiator pyrotechnic load and the decomposition process. In Example 1, the gas discharge resulted in a holding tank pressure of only about 18 psi (124 kPa), whereas in Examples 2 and 3, the gas discharge resulted in a holding tank pressure of about 28 psi (193 kPa).

Evidently, the 225 mg pyrotechnic load used in Example 1 was insufficient to accomplish adequate decomposition of the nitrous oxide contained within the inflator device used therein. Increasing the pyrotechnic load to 275 mg (Example 2), however, greatly increased performance (e.g., resulted in significantly higher gas discharge pressure in the holding tank). The further increase in the pyrotechnic load to 400 mg (Example 3), however, did not significantly further increase performance. Thus it would appear that initiator strength (e.g., load or amount of pyrotechnic) will affect performance only up to a certain relative ratio of the load of pyrotechnic to the load of decomposable material.

Analysis of the gas discharge in each of these examples revealed that less undecomposed nitrous oxide was detected in the effluent when the initiator size was increased from 225 mg to 275 mg and then to 400 mg.

EXAMPLE 5

This example utilized an inflator assembly similar to the inflator assembly 10, shown in FIG. 1, and operated at ambient temperature. The chamber (14) of the inflator assembly of this example had a volume of 8.5 in$^3$ (139.3 cc) and was filled with about 12 grams of pure nitrous oxide. A pyrotechnic initiator (1000 mg of ZPP) was used as a decomposition initiation source.

The inflator assembly was deployed into a rigid 60 liter holding tank which featured a 0.4375 inch diameter (1.11 cm) vent through the tank wall. The tank pressure as a function of time was monitored for the deployment.

Figure 7:
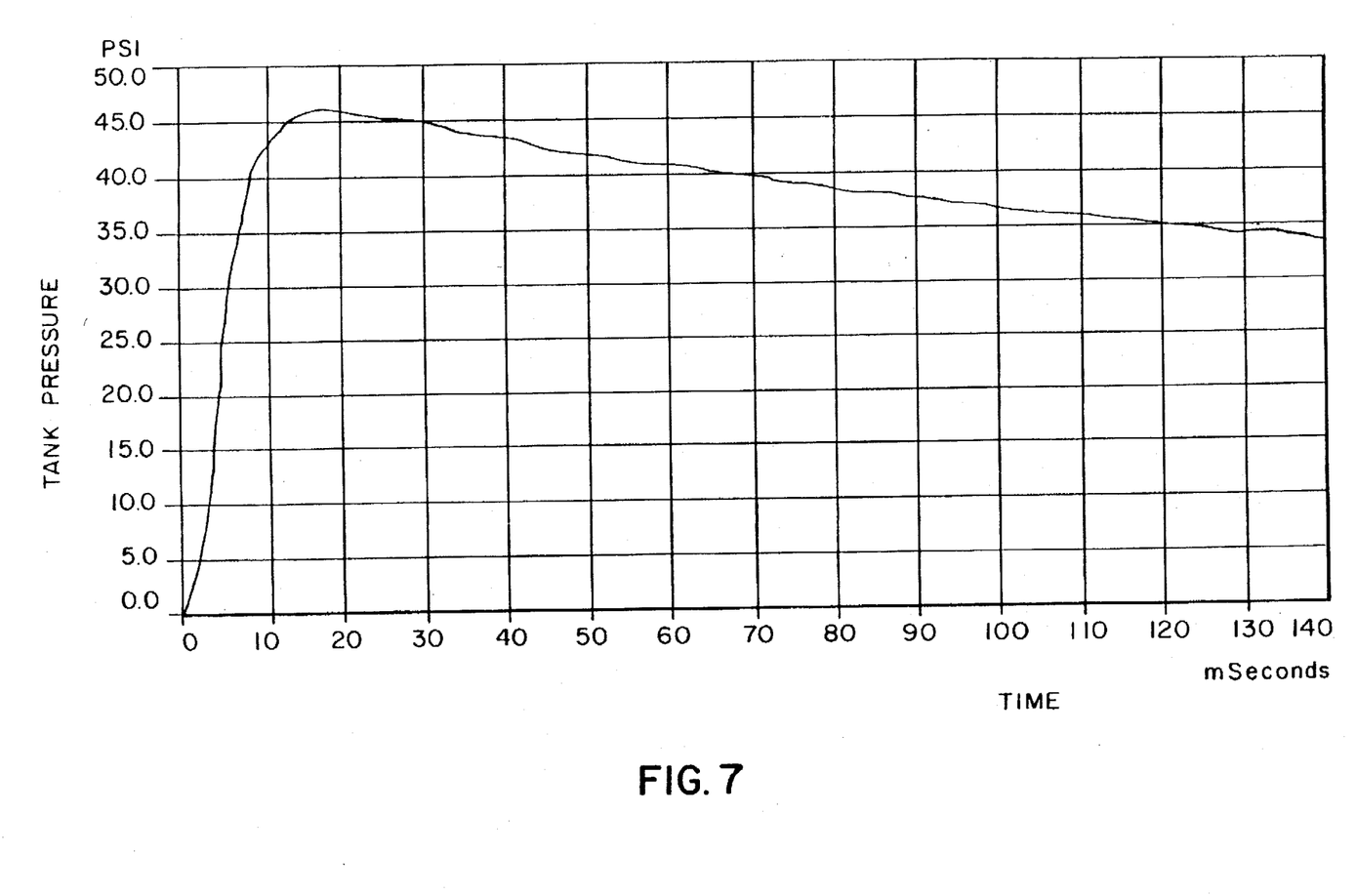
FIG. 7 shows the tank pressure versus time performance obtained in Example 5 using an inflator assembly in accordance with an alternative embodiment of the invention.

FIG. 7 presents the tank pressure as a function of time obtained in Example 5.

DISCUSSION OF RESULTS

This example, wherein the inflator assembly exhibited an initial pressure output delay of only about 1.7 ms; a 20 ms and 40 ms tank pressure of about 45.7 psi (315 kPa) and 43.4 psi (299 kPa), respectively; and a maximum tank pressure of about 45.6 psi (314 kPa) at about 20.7 ms, illustrates the operability of such an inflator assembly.

As identified above, inflator assemblies in accordance with the invention appear well suited for utilization in side impact applications where speed of response can be especially significant.

It is to be understood that the discussion of theory, such as the discussion of decomposition, for example, is included to assist in the understanding of the subject invention and is in no way limiting to the invention in its broad application.

The invention illustratively disclosed herein suitably may be practiced in the absence of any element, part, step, component, or ingredient which is not specifically disclosed herein.

The foregoing detailed description is given for clearness of understanding only, and no unnecessary limitations are to be understood therefrom, as modifications within the scope of the invention will be obvious to those skilled in the art.

What is claimed is:

1. An apparatus for inflating an inflatable device, said apparatus comprising:

a first chamber having contents including at least one gas source material selected from the group consisting of nitrous oxide, acetylene or an acetylene-based material and which undergoes decomposition to form decomposition products including at least one gaseous decomposition product used to inflate the device, and an initiator to initiate the decomposition of the at least one gas source material in said first chamber.

2. The apparatus of claim 1 wherein the contents have an equivalence ratio of less than 0.1.

3. The apparatus of claim 1 wherein the gas source material comprises $N_2O$.

4. The apparatus of claim 1 wherein the contents additionally include inert gas.

5. The apparatus of claim 1 wherein the contents additionally include at least one sensitizer material present in an amount below the flammability limit of the contents.

6. The apparatus of claim 5 wherein the sensitizer material is hydrogen-bearing.

7. The apparatus of claim 6 wherein the sensitizer material is $H_2$.

8. The apparatus of claim 6 wherein the sensitizer material is selected from the group consisting of hydrocarbons, hydrocarbon derivatives and cellulosic materials.

9. The apparatus of claim 1 wherein the decomposition undergone by the at least one gas source material is exothermic.

10. The apparatus of claim 1 wherein the contents are stored, at least in part, in a liquid form in said first chamber.

11. The apparatus of claim 1 wherein said first chamber is adapted to be selectively opened, said apparatus additionally comprising a second chamber in fluid communication with said first chamber upon the opening of said first chamber.

12. The apparatus of claim 11 wherein said second chamber stores pressurized inert gas.

13. The apparatus of claim 11 additionally comprising an opening device for said second chamber.

14. The apparatus of claim 11 wherein said second chamber stores contents including at least one second gas source material which undergoes decomposition to form decomposition products including at least one gaseous decomposition product.

15. A side impact inflator apparatus comprising the apparatus of claim 1.

16. An apparatus for inflating an inflatable device, said apparatus comprising:

a first chamber having contents including at least one gas source material which undergoes decomposition to produce decomposition products including at least one gaseous decomposition product, said first chamber adapted to open when a predetermined increase in pressure within said first chamber is realized, whereby at least a portion of the decomposition products including at least a portion of the at least one gaseous decomposition product is released from said first chamber;

a second chamber containing a supply of pressurized stored gas, said second chamber in fluid communication with said first chamber upon the opening of said first chamber with the at least a portion of the decomposition products released from said first chamber mixing with the pressurized stored gas to produce inflation gas and increasing the temperature and pressure within said second chamber, said second chamber adapted to open when a predetermined increase in pressure within said second chamber is realized, whereby at least a portion of the inflation gas is released from said second chamber to inflate said device, and an initiator to initiate the decomposition of the at least one gas source material in said first chamber.

17. The apparatus of claim 16 wherein the gas source material comprises $N_2O$.

18. The apparatus of claim 16 wherein the first chamber contents additionally include inert gas.

19. The apparatus of claim 16 wherein the first chamber contents additionally include at least one sensitizer material present in an amount below the flammability limit for the first chamber contents.

20. The apparatus of claim 19 wherein the sensitizer material is hydrogen-bearing.

21. The apparatus of claim 20 wherein the sensitizer material is $H_2$.

22. The apparatus of claim 20 wherein the sensitizer material is selected from the group consisting of hydrocarbons, hydrocarbon derivatives and cellulosic materials.

23. The apparatus of claim 16 wherein the decomposition undergone by the at least one gas source material is exothermic.

24. The apparatus of claim 16 wherein the first chamber contents are stored, at least in part, in a liquid form in said first chamber.

25. The apparatus of claim 16 additionally comprising an opening device for said second chamber.

26. A multiple level airbag inflator which includes at least one chamber, said inflator comprising:

a first chamber having contents including at least one gas source material adapted to undergo decomposition upon actuation to form decomposition products including at least one gaseous decomposition product for use in an inflating inflatable device, an initiator to initiate the decomposition of the at least one gas source material in said first chamber, and a chamber opening device adapted to selectively open a chamber of said inflator whereby the contents of said selectively opened chamber at least in part are released from said inflator.

27. The multiple level airbag inflator of claim 26 additionally comprising a second chamber in fluid communication with said first chamber upon the opening of said first chamber, wherein said chamber opening device is adapted to selectively open said second chamber.

28. The multiple level airbag inflator of claim 27 wherein said second chamber stores pressurized inert gas.

29. The multiple level airbag inflator of claim 27 wherein said second chamber stores contents including at least one second gas source material adapted to undergo decomposition to form decomposition products including at least one gaseous decomposition product.

30. The multiple level airbag inflator of claim 29 wherein said chamber opening device is additionally adapted to actuate the decomposition of the contents of said second chamber.

31. A method for inflating an inflatable safety device in a vehicle using an inflation apparatus, said method comprising the steps of:

decomposing at least one gas source material in a first chamber of the apparatus to form decomposition products including at least one gaseous decomposition product and releasing inflation gas comprising at least a portion of the at least one gaseous decomposition product from the apparatus to inflate the inflatable safety device, wherein in said method at least one of the following conditions is also satisfied:
a) the at least one gas source material is selected from the group consisting of nitrous oxide, acetylene or an acetylene-based material and
b) the method additionally comprises the step of mixing the decomposition products with a stored gas to form inflation gas for said release from the apparatus to inflate the inflatable safety device.

32. The method of claim 31 including the step of mixing the decomposition products with a stored gas to form inflation gas for said release from the apparatus to inflate the inflatable safety device.

33. The method of claim 32 wherein said decomposing increases the temperature and pressure within the first chamber with the first chamber opening when a predetermined increase in the pressure within the first chamber is realized to release at least a portion of the inflation gas including at least a portion of the at least one gaseous decomposition product from the first chamber to inflate the inflatable safety device.

34. The method of claim 31 wherein said decomposing increases the temperature and pressure within the first chamber with the first chamber opening when a predetermined increase in the pressure within the first chamber is realized to release at least a portion of the inflation gas including at least a portion of the at least one gaseous decomposition product from the first chamber to inflate the inflatable safety device.

35. In an inflation apparatus additionally including a second chamber containing a supply of pressurized stored gas, the method of claim 31 including the step of:

mixing the decomposition products with the stored gas to form inflation gas for said release from the apparatus to inflate the inflatable safety device.

36. The method of claim 35 wherein said mixing increases the temperature and pressure within the second chamber with the second chamber opening when a predetermined increase in the pressure within the second chamber is realized to release at least a portion of the inflation gas including at least a portion of the at least one gaseous decomposition product and the stored gas to inflate the inflatable safety device.

37. The method of claim 31 wherein the contents of the first chamber have an equivalence ratio of less than 0.1.

38. The method of claim 31 wherein the gas source material which undergoes said decomposition comprises $N_2O$.

39. The method of claim 31 wherein said decomposition is accelerated by the presence of at least one sensitizer material in an amount below the flammability limit.

40. The method of claim 39 wherein the sensitizer material is hydrogen-bearing.

41. The method of claim 39 wherein the sensitizer material is $H_2$.

42. The method of claim 31 wherein said decomposition is exothermic.

43. A method of operation of a multiple level air bag inflator which includes at least one chamber, the inflator including:

a first chamber having contents including at least one gas source material adapted to undergo decomposition upon actuation to form decomposition products including at least one gaseous decomposition product for use in inflating an inflatable device, an initiator to initiate the decomposition of the at least one gas source material in the first chamber, and a chamber opening device adapted to selectively open a chamber of the inflator whereby the contents of the selectively opened chamber at least in part are released from the inflator, said method comprising:

selectively actuating at least one of the initiator and the chamber opening device.

44. The method of claim 43 wherein said selective actuation comprises at least one of the following modes of operation:

a. actuation of the initiator without actuation of the chamber opening device;
b. actuation of the chamber opening device without actuation of the initiator; and
c. actuation of both the initiator and the chamber opening device.

45. The method of claim 43 wherein the inflator additionally includes a second chamber in fluid communication with the first chamber upon the opening of the first chamber and wherein the chamber opening device is adapted to selectively open the second chamber, wherein said selective actuation comprises at least one of the following modes of operation:

a. actuation of the initiator without actuation of the chamber opening device;
b. actuation of the chamber opening device without actuation of the initiator; and
c. actuation of both the initiator and the chamber opening device.

46. The method of claim 45 wherein said selective actuation comprises actuation of both the initiator and the chamber opening device in a selected sequence with a selected time interval between the actuation of each.

47. The method of claim 46 wherein the initiator and the chamber opening device are actuated substantially simultaneously.

48. The method of claim 46 wherein the chamber opening device is actuated to begin release of the contents of the second chamber without the first chamber having opened.

49. The method of claim 46 wherein the initiator is actuated to initiate the decomposition of the at least one gas source material in the first chamber prior to the release of any of the contents of the second chamber.

50. The method of claim 43 wherein the contents of the first chamber have an equivalence ratio of less than 0.1.

51. The method of claim 43 wherein the gas source material which undergoes the decomposition comprises $N_2O$.

52. The method of claim 43 wherein the decomposition is accelerated by the presence of at least one sensitizer material in an amount below the flammability limit.

53. The method of claim 52 wherein the sensitizer material is hydrogen-bearing.

54. The method of claim 53 wherein the sensitizer material is $H_2$.

55. The method of claim 43 wherein the decomposition is exothermic.

56. The apparatus of claim 1 wherein the gas source material comprises acetylene or an acetylene-based material.

57. The apparatus of claim 16 wherein the gas source material comprises acetylene or an acetylene-based material.

58. The method of claim 31 wherein the gas source material which undergoes said decomposition comprises acetylene or an acetylene-based material.

59. The method of claim 43 wherein the gas source material which undergoes the decomposition comprises acetylene or an acetylene-based material.

* * * * *